US012658684B2

(12) United States Patent
Meine

(10) Patent No.: US 12,658,684 B2
(45) Date of Patent: Jun. 16, 2026

(54) JUNCTION BOX WITH FLASHING

(71) Applicant: Unirac, Inc., Albuquerque, NM (US)

(72) Inventor: Shawn Meine, Phoenix, AZ (US)

(73) Assignee: Unirac, Inc., Albuquerque, NM (US)

( * ) Notice: Subject to any disclaimer, the term of this patent is extended or adjusted under 35 U.S.C. 154(b) by 0 days.

(21) Appl. No.: 18/827,093

(22) Filed: Sep. 6, 2024

(65) Prior Publication Data

US 2025/0087979 A1     Mar. 13, 2025

Related U.S. Application Data

(60) Provisional application No. 63/537,128, filed on Sep. 7, 2023.

(51) Int. Cl.
H02G 3/10 (2006.01)
H02G 3/14 (2006.01)
(52) U.S. Cl.
CPC ................. H02G 3/10 (2013.01); H02G 3/14 (2013.01)
(58) Field of Classification Search
CPC ............. H02G 3/10; H02G 3/14; H02G 3/088
See application file for complete search history.

(56) References Cited

U.S. PATENT DOCUMENTS

| | | | |
|---|---|---|---|
| 6,007,353 A | 12/1999 | Webster | |
| 6,942,189 B2 | 9/2005 | Capozzi | |
| 7,626,118 B1 | 12/2009 | Capozzi | |
| 8,471,145 B2 | 6/2013 | Suzuki | |
| 9,819,166 B1 | 11/2017 | Capozzi | |
| 10,297,997 B1 | 5/2019 | Wiese | |
| 10,367,341 B1 | 7/2019 | Baldwin | |
| 10,594,121 B2 | 3/2020 | Yang | |
| 10,804,685 B2 | 10/2020 | Yang | |
| 11,201,457 B1 | 12/2021 | Wiese | |
| 11,349,288 B2 | 5/2022 | Yang | |
| 11,848,548 B1 | 12/2023 | Affentranger, Jr. | |
| 2021/0328415 A1 | 10/2021 | Meine | |
| 2022/0085585 A1 | 3/2022 | Wade | |

OTHER PUBLICATIONS

International Search Report and Written Opinion for International Application No. PCT/US2024/045665, dated Nov. 14, 2024, 11 pages.

*Primary Examiner* — Stephen J Castellano
(74) *Attorney, Agent, or Firm* — Lee & Hayes, P.C.

(57) ABSTRACT

A junction box comprising a base configured to mount to a roof, the base including an enclosed bottom, an open end opposite the enclosed bottom, a first side extending from the enclosed bottom to the open end, a second side opposite of the first side, a third side extending from the first side to the second side, and a fourth side opposite the third side, a wall extending from the first side to the second, a high point disposed along the wall, the high point having an angle within a range of 90 degrees and 180 degrees, a lid sized to seal against and hingedly connect to the base, and a flashing that extends from a portion of the first side of the base, from a portion of the second side of the base, and from the wall, in a direction away from the base.

20 Claims, 6 Drawing Sheets

FIG. 2

JUNCTION BOX WITH FLASHING

CROSS-REFERENCE TO RELATED PATENT APPLICATION

This application claims priority to U.S. Provisional Patent Application 63/537,128, filed Sep. 7, 2023, entitled "Junction Box with Flashing," and incorporates the content thereof in its entirety by reference.

BACKGROUND

Electrical junction boxes are generally configured to receive, route, and connect electrical cables and/or circuit elements from multiple electrical components. The junction boxes are typically covered or completely closed to minimize interruption and destruction of the components and circuits associated with the electrical cables coupled therein.

Depending on the materials used, a junction box may not be well-suited for use in outdoor environmental conditions. For example, metal junction boxes may rust or deteriorate due to exposure to water and heat. Certain plastics, if used, may suffer similar degradation.

Nevertheless, the known junction boxes that are intended to be used in outdoor environmental conditions still suffer from deficiencies. For example, a junction box to be attached to an exterior surface of a structure for implementation of a solar panel module system may be partially sealed from the environment. However, upon attachment to an exterior surface, moisture from weather conditions may build on and/or around the junction box, thus increasing the risk of moisture damage to the structure.

For example, many junction boxes use multiple fasteners, such as bolts or screws, to secure the box lid to the box. Frequently, loose fasteners are dropped and lost on a sloped roof surface. Further, where multiple fasteners are involved, more time is needed for installation.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

FIG. 2 illustrates a bottom, front, left-side perspective view of a junction box, according to an embodiment of this disclosure.

DETAILED DESCRIPTION

Figure 1:
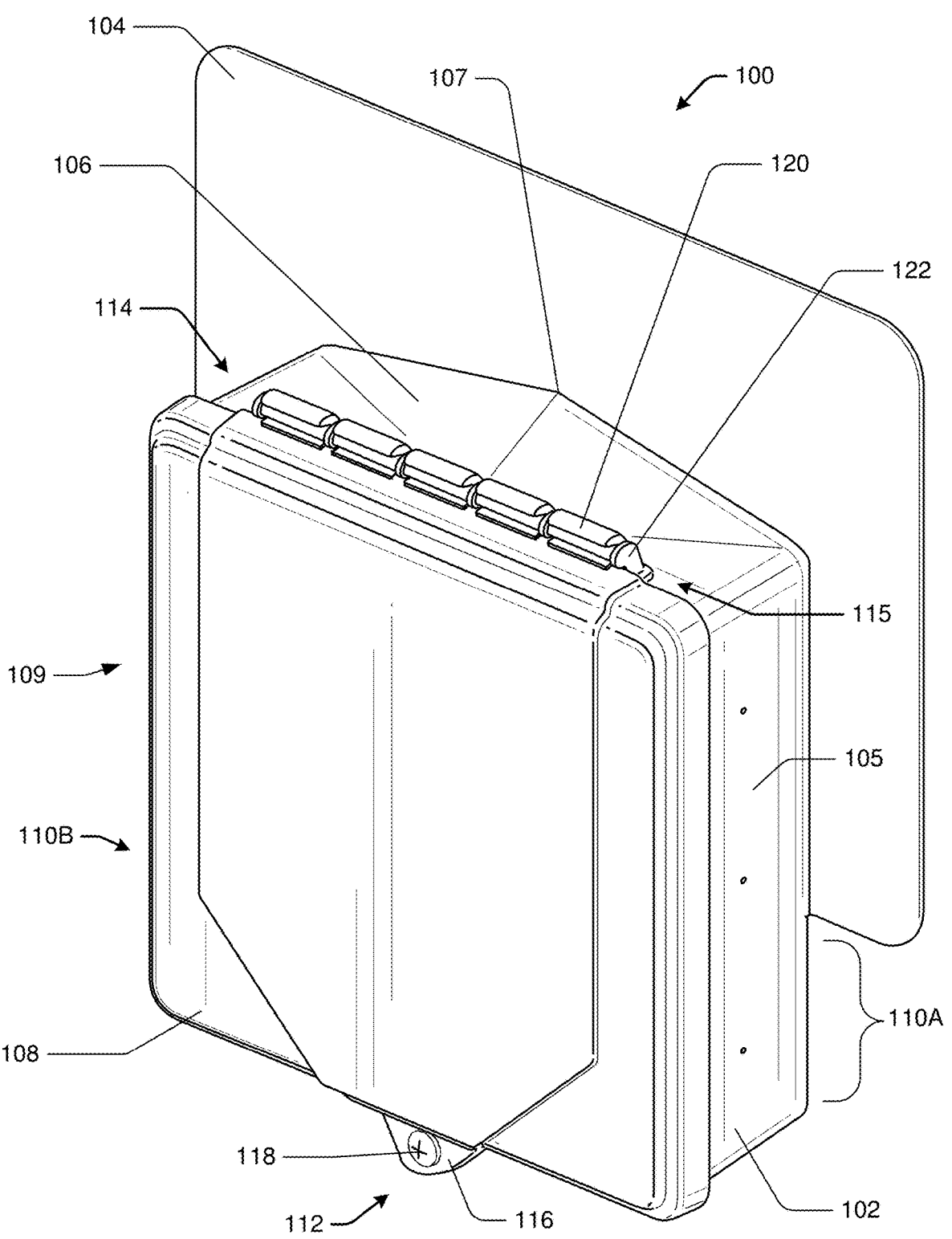
FIG. 1 illustrates a top, rear, right-side perspective view of a junction box, according to an embodiment of this disclosure.

This disclosure is directed to a junction box with integral flashing. That is, when compared to industry practice, this disclosure describes a junction box with flashing that continuously extends from a portion of the junction box base (i.e., the flashing and the junction box base are one continuous and/or seamless piece) and includes a water diverter that continuously extends from a portion of the junction box base (i.e., the water diverter extends from a lateral side of the junction box base and is shaped to direct water flow away from the junction box base). Accordingly, the base of a junction box described within this disclosure includes a flashing footprint that is oriented on the junction box such that the flashing is disposed on less than an entirety of the perimeter of the junction box base. In an embodiment, the flashing terminates part of the way down the downslope dimension of the box. A junction box such as described may be set for use on a residential pitched roof. Therefore, the term "downslope dimension" as just used refers to the lateral side of the box, which is intended to be oriented downslope when mounted correctly to a sloped roof. That is, the flashing sits on the roof deck and the flashing may extend fully under a first upslope course of composition shingle flashings and partially under a second upslope course of shingle flashing. Similarly, the water diverter may be disposed on the upslope side of the junction box base, so any water flowing down the pitched roof may reach the water diverter and be directed away from the junction box base.

In an embodiment, the junction box with flashing may include a lid, a base, a flashing, and a water diverter. The junction box with flashing may be configured to sit on a pitched roof such that the integral flashing portion of the base may be disposed under one or more shingle flashings. Although the junction box with flashing is described throughout this disclosure and depicted within the accompanying FIGS. 1-6 as being used on pitched residential roofs using composite shingle flashing, it is understood that the junction box with flashing may be used on pitched and/or non-pitched roofs, residential and/or non-residential roofs, and may also be used on roofs with non-composite shingle flashing (e.g., wood shingles, asphalt shingles, metal roofing, tile roofing, slate, organic material roofing, etc.).

In an embodiment, the base may be formed with plastic, resin, or any other suitable material. The base may include a bottom wall, a front wall (e.g., located downslope), a rear wall (e.g., located upslope), a first side wall that extends between the front wall and the rear wall, and a second side wall that extends between the front wall and the rear wall opposite the first side wall. The base may include one or more bosses or holes within the body (e.g., side walls and/or bottom wall of the box forming the base) thereof to accommodate mounting one or more of various components (e.g., grounding bus bar, wires, DIN rail, etc.).

In an embodiment, the flashing portion of the base may extend from a portion of the first side wall, the rear wall, and a portion of the second side wall. Moreover, the flashing portion extends beneath the water diverter. In an embodiment, a surface profile of the water diverter may be shaped to have a pyramidal point and may be positioned on the rear wall such that the pyramidal point is centrally/symmetrically located with respect to the rear wall and the flashing portion. Other surface profile shapes for the water diverter may suffice, such as a rounded, curved, or triangular surface profile, so long as the shape causes a water diversion. Accordingly, the water diverter may be defined by one wall (e.g., a single rounded or curved wall with a high point to divert water) or multiple walls (e.g., a triangular water diverter may be defined by two or more intersecting walls that come together at a high point). The water diverter is thus configured to direct water (e.g., rainwater, etc.) collecting against the outside surface of the rear wall to flow along the first sidewall and/or the second side wall.

In an embodiment, the lid may be formed with plastic, resin, or any other suitable material. The lid may be shaped to pivotally seat with a top edge of the base such that a weather-resistant and/or weatherproof seal is created between the lid and the base, when closed, with or without the use of a gasket or gasket material between the lid and the base.

In an embodiment, the lid may include a lid lock portion and a hinge portion. The lid lock portion of the lid may be configured to connect the lid in a securable manner to the base. For example, in an embodiment, the lid may be secured to the base via a fastener that passes through an aperture in a flange that extends from an edge of the lid at the lid lock portion and connects with the base (described further below). The hinge portion may be configured to pivotally connect the lid to a pivot point of the base. For example, in an embodiment, the hinge portion of the lid may include hinge protrusions. In an embodiment, the hinge protrusions may include at least an upper hinge tab and a lower hinge tab, each of which extends from an edge of the lid. The upper hinge tab and the lower hinge tab may be oriented proximate to each other to define between them a space as a hinge point whereby the lid may be pivoted for removal from, or placement on, the base. The space permits the upper hinge tab and the lower hinge tab to engage with the base.

Turning to the drawings, FIG. 1 illustrates an embodiment of a junction box with flashing (junction box) 100 that may include a base 102, a flashing 104, a water diverter 106, and a lid 108 hingedly connected to the base 102.

In an embodiment, the water diverter 106 may extend away from the base and include a high point 107 (e.g., a pyramidal point, point of diversion, etc.). In an embodiment, the high point 107 may be positioned on the water diverter 106 such that the high point 107 is centrally/symmetrically located with respect to the rear wall of the base 102 and the flashing 104. In an embodiment, water diverter 106 may be defined by two or more intersecting walls with each intersecting wall originating from an opposite side wall of the base and extending toward the other intersecting wall. The intersecting walls may reach a high point 107 (i.e., point of diversion) that may be a pyramidal point.

In an embodiment, the flashing 104 extends along the base such that the flashing 104 extends outward from a portion of a first sidewall 105 of the base. A portion of the first sidewall 105 does not have flashing 104 extending from therefrom, which is a first non-flashing portion 110A. The flashing 104 also extends from an opposite side, from a second sidewall 109 of the base (not visible in FIG. 1). Similar to the first sidewall 105, a portion of the second sidewall 109 does not have flashing 104 extending therefrom, which is a second non-flashing portion 110B (not fully visible in FIG. 1). The lengths of non-flashing portion 110A and non-flashing portion 110B may be predetermined prior to manufacture. In other words, in an embodiment, the flashing 104 may extend along a length of the first side wall and the second side wall in a range from a quarter or less to a half or more of the length of the first side wall and the second side wall. It is understood that non-flashing portion 110A and non-flashing portion 110B may be the same length. By incorporating non-flashing portions 110A/110B, the junction box 100 reduces the cost of manufacture and shipping due to the minimized amount of material weight, without compromising the integrity of the product. Additional benefits may include other inventory and logistical benefits.

In an embodiment, lid 108 may include a lid lock portion 112 and a hinge portion 114. The lid lock portion 112 may include a lid fastening protrusion 116 and a lid fastener 118. The hinge portion 114 may include one or more lid hinge protrusion(s) 120 and one or more base hinge protrusion(s) 122.

In an embodiment, the lid fastening protrusion 116 includes an aperture configured to receive the lid fastener 118 (the "aperture" is not visible in the figures, as the lid fastener 118 is shown extending therethrough). It is understood that the lid fastener 118 may be a captive fastener (i.e., the lid fastener 118 may be disposed in a retained manner within lid fastening protrusion 116) to minimize the potential for the lid fastener 118 to be dropped and/or fall, which may cause a delay in maintenance and/or installation. Alternatively, instead of utilizing lid fastener 118, it is understood that the lid 108 may include a different fastening mechanism (e.g., latch, clip, etc.). In an embodiment, the hinge portion 114 of lid 108 may be disposed opposite the lid lock portion 112 of the lid 108.

Additionally, in an embodiment like shown in the figures, the hinged joint 115 in combination with a single captive fastener (e.g., lid fastener 118) may enable a faster installation experience than previously experienced by reducing the number of fasteners required to secure the lid 108. This reduction also provides a quicker installation time since a single captive fastener (e.g. lid fastener 118) is lined up directly and held in place simply ready for tightening. That is, a single captive fastener (e.g. lid fastener 118) is held captive in the lid 108, which is not prone to being dropped and falling down the roof causing a significant delay in installation. Further, the lid 108 may be removed for full access to the junction box 100 with the hinged joint 115 permitting the lid 108 to be quickly snapped-on or snapped off.

Figure 2:
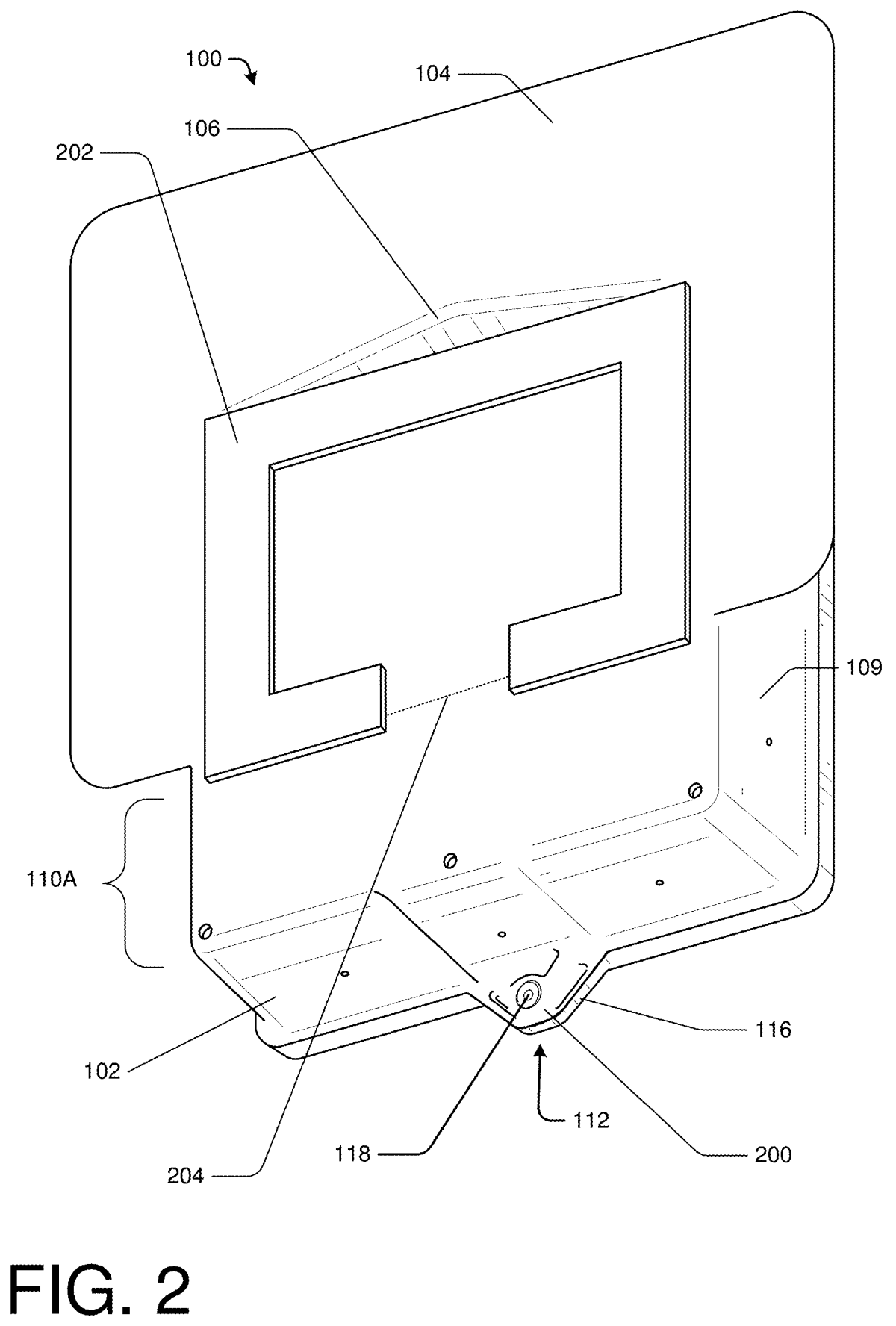

FIG. 2 illustrates a bottom, front, left-side perspective view of the junction box 100 of FIG. 1. In an embodiment, the base 102 may include a base fastening protrusion 200. In an embodiment, the base fastening protrusion 200 may be shaped to compliment the shape of lid fastening protrusion 116 (i.e., the shape of the base fastening protrusion 200 may be similar to the lid fastening protrusion 116). In an embodiment, the base fastening protrusion 200 may include an aperture configured to align with an aperture within the lid fastening protrusion 116 in order for the lid fastener 118 to pass through both fastening protrusions (116, 200). In an embodiment, the base fastening protrusion 200 may be configured to engage with the lid fastener 118 (i.e., the aperture within the base fastening protrusion 200 may be threaded and/or the aperture within the base fastening protrusion 200 may be configured to receive hardware that is threaded). In an embodiment, the lid fastener 118 may extend only long enough to extend just beyond the base fastening protrusion 200. It is understood that lid fastener 118 may have any length as required, such as to catch a nut (not shown) on the underside to secure the lid, if needed.

In an embodiment a sealant 202 (e.g., adhesive, butyl, tape, silicone, gasket, or any other suitable sealant) may be placed on an underside of the base 102 of the junction box 100. In an example embodiment, the sealant 202 may be positioned to be at least partially under the portion of the base 102 where the flashing 104 extends. Further, in an example embodiment, the sealant 202 may extend partially beyond the portion of the base 102 at which the flashing 104 extends into the portion without flashing 110. In an embodiment, the sealant 202 may be placed with an opening 204 between adjacent ends of the sealant 202 along the downslope end of the junction box 100, to allow for moisture to escape if any passes through from above unintentionally.

Figure 3:
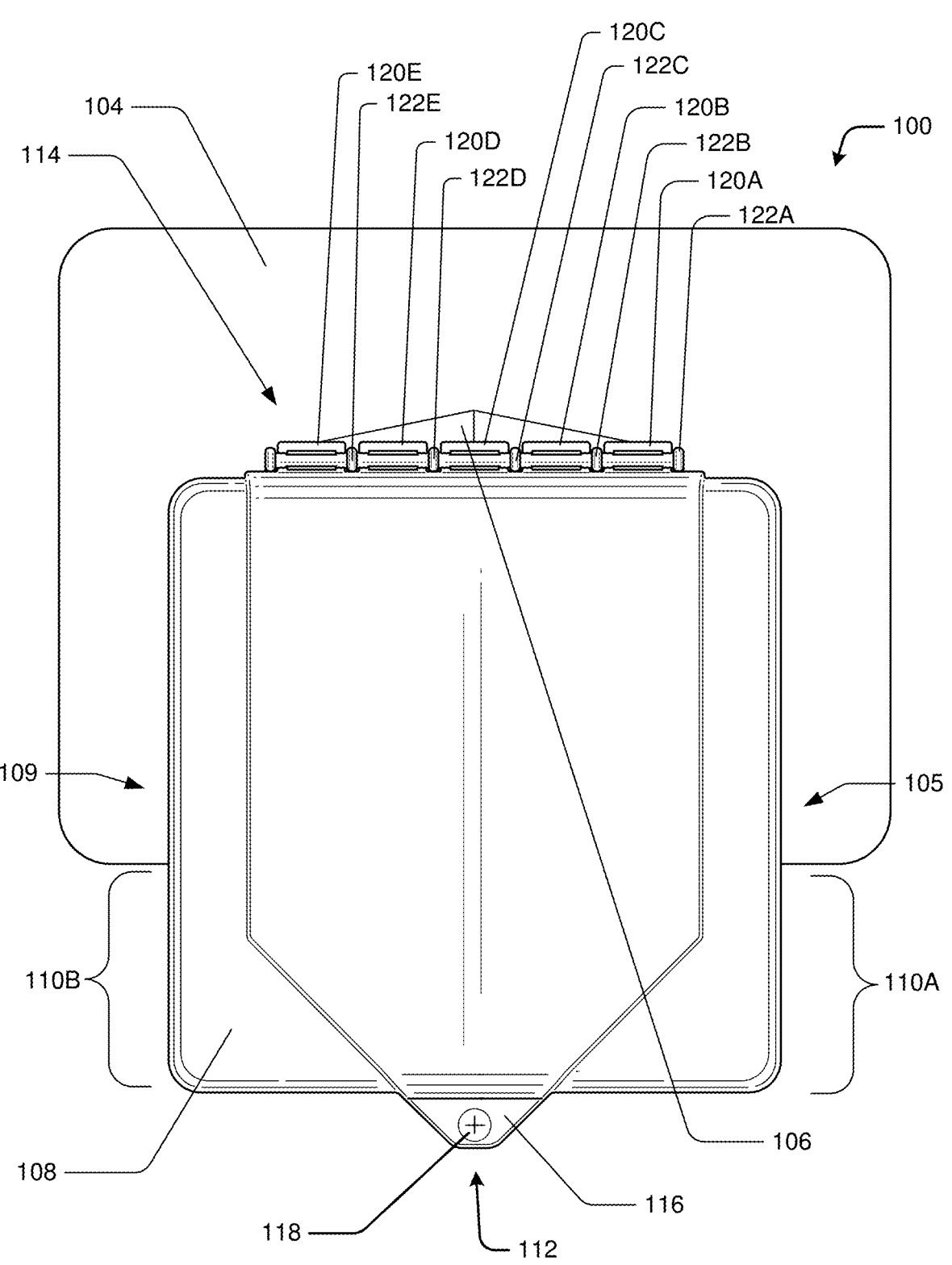
FIG. 3 illustrates a top view of a junction box, according to an embodiment of this disclosure.

FIG. 3 illustrates a top view of the junction box 100 of FIG. 1, according to an embodiment of this disclosure. In an embodiment, when seated upon the base 102, the lid 108 may extend over the base 102 (i.e., the lid 108 extends over the upper portion of the base 102). It is understood that the hinge portion 114 may include one or more lid hinge protrusion(s) 120 (e.g., 120A, 120B, . . . , 120n) and one or more base hinge protrusion(s) 122 (e.g., 122A, 122B, . . . , 122n). Although the junction box 100 is depicted within FIG. 3 as having five lid hinge protrusions 120A-120E and five base hinge protrusions 122A-122E, it is understood that the junction box 100 may have a hinge portion 114 that has as many lid hinge protrusions 120 and base hinge protrusions 122 as required (i.e., a narrow junction box 100 may have a hinge portion 114 that has three lid hinge protrusions and three base hinge protrusions, a wide junction box 100 may have a hinge portion 114 that has six lid hinge protrusions and six base hinge protrusions, etc.).

Figure 4:
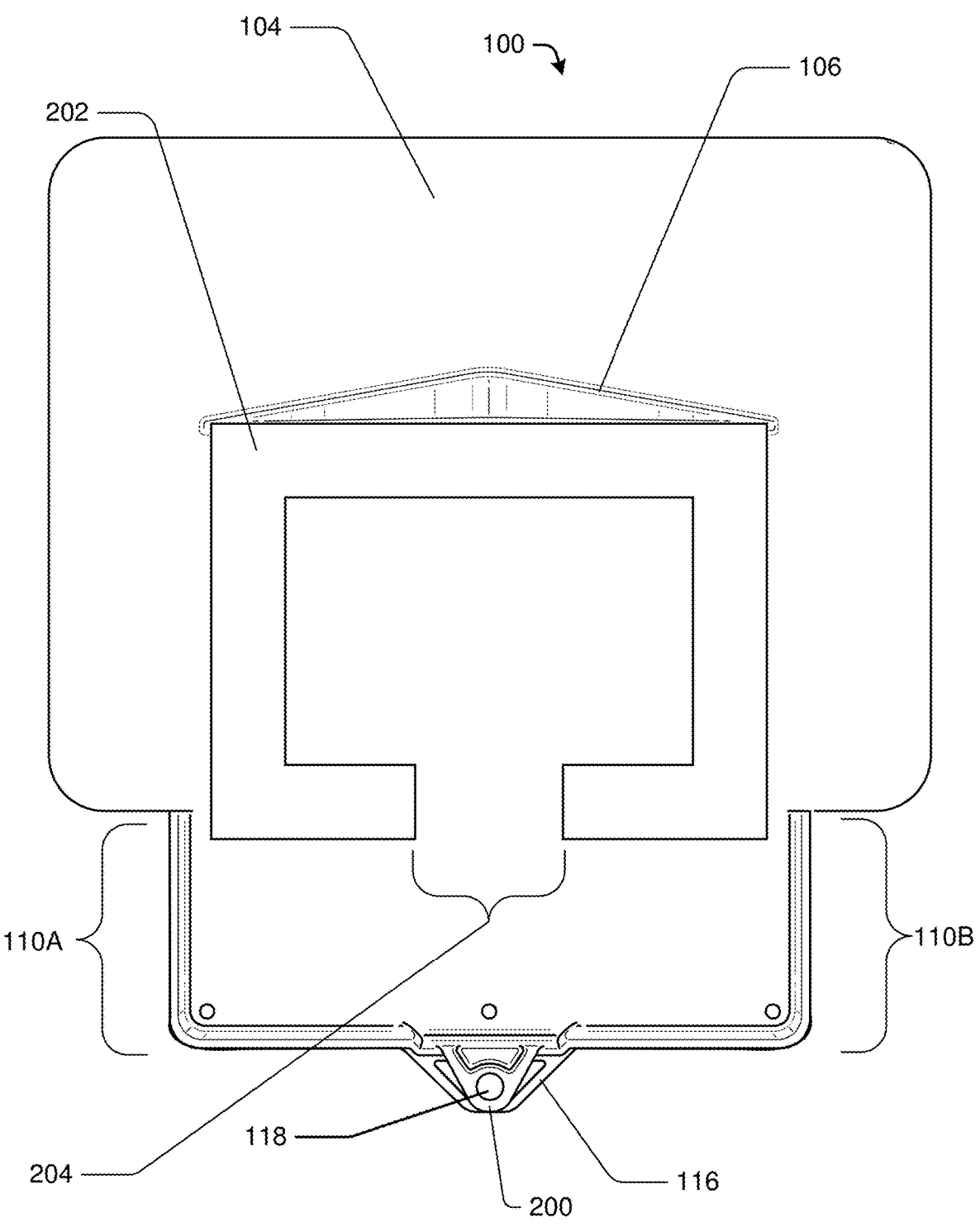
FIG. 4 illustrates a bottom view of a junction box, according to an embodiment of this disclosure.

FIG. 4 illustrates a bottom view of the junction box 100 of FIG. 1, according to an embodiment of this disclosure.

Figure 5:
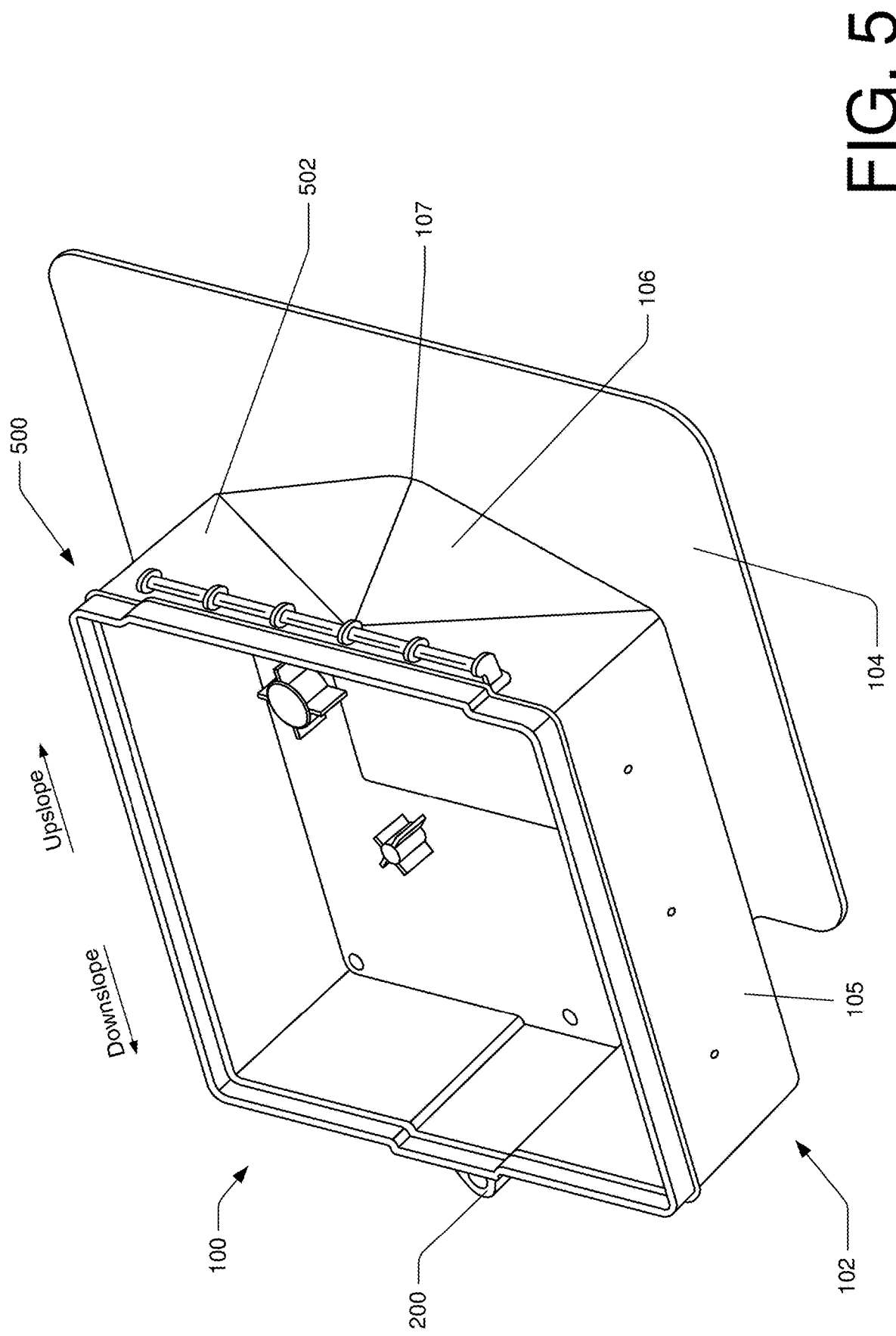
FIG. 5 illustrates a top, rear, right-side isometric view of the embodiment of the junction box of FIG. 1 showing the lid removed, according to an embodiment of this disclosure.

FIG. 5 depicts a junction box 100 with the lid 108 removed from the base 102 (which may be snapped off, for example). Arrows depicting the intended downslope side of the box and the intended upslope side of the junction box 100 are shown to provide context for the disclosure.

Figure 6:
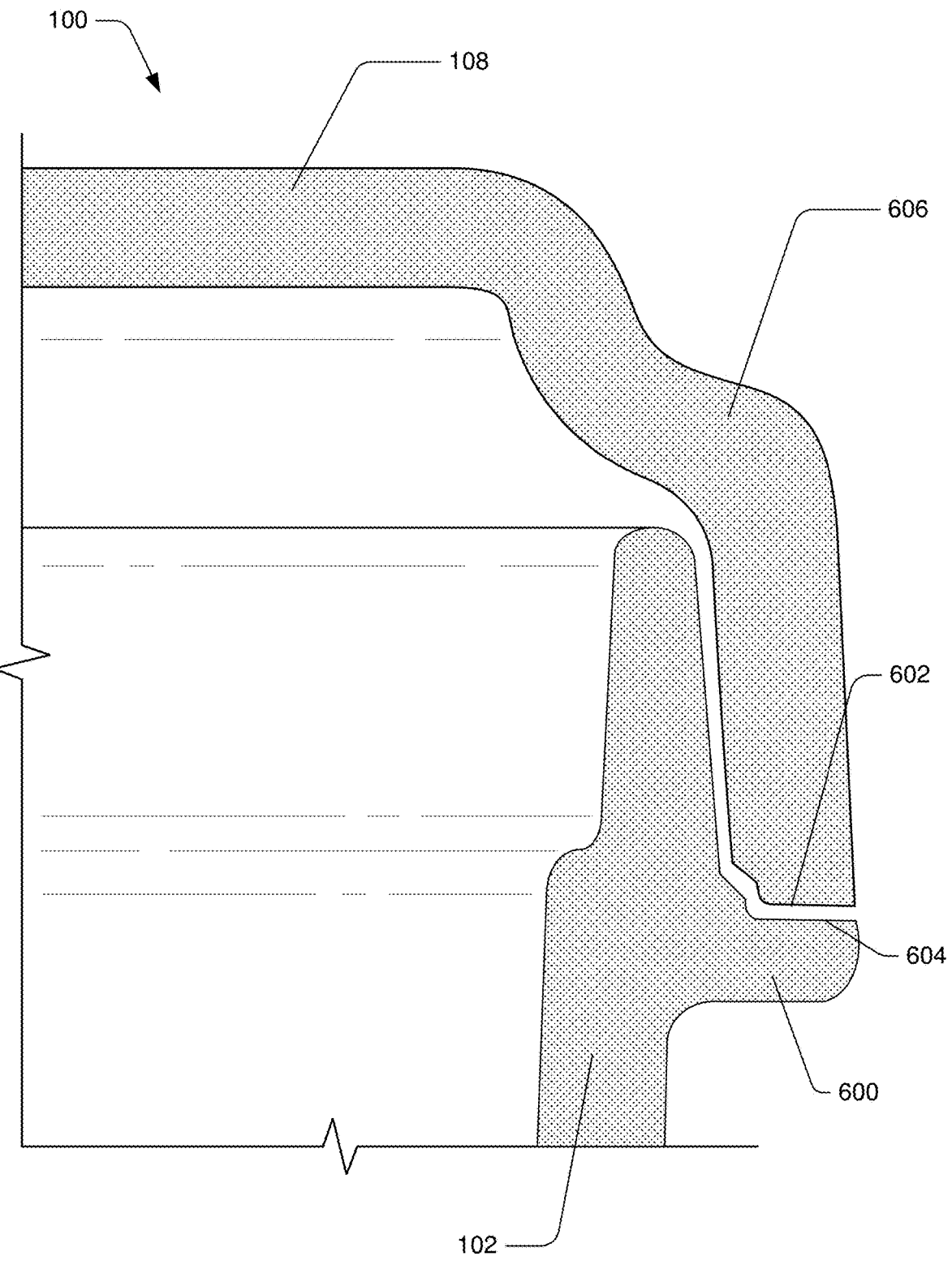
FIG. 6 illustrates a close-up view of a cross-section of the upper distal edge of the base of the junction box with the lid in place, according to an embodiment of this disclosure.

FIG. 6 illustrates a close-up view of a cross-section of the upper distal edge of the junction box 100 with the lid 108 installed on the base 102. In an embodiment, a lid seating ledge 600 may be configured to receive a lid 108 that has a base seating surface 602. The lid seating ledge 600 may protrude from the base 102. The lid seating ledge 600 may also include a lid seating surface 604 that is configured to support the lid 108 (i.e., when the lid 108 is installed on the base 102, the base seating surface 602 of the lid 108 may rest on the lid seating surface 604 of the lid seating ledge 600). In an embodiment, the angle of the base seating surface 602 of the lid 108 may be configured to match the angle of the lid seating surface 604 of the lid seating ledge 600, such that the lid seating surface 604 and the base seating surface 602 may planarly engage with each other. In an embodiment, the lid seating surface 604 of the lid seating ledge 600 and the base seating surface 602 may be configured to, when the lid 108 is closed, closely engage with each other to create a weather-resistant and/or weatherproof seal without the use of a gasket.

In an embodiment, the outside surface of the lid 108 may extend to the edge of the lid seating ledge 600, such that there is no flow path for water (e.g., splashing water from rain, water building up on the water diverter 106 before being diverted, etc.) to travel into the junction box 100. In an embodiment, the lid 108 may include a shouldered portion 606 configured to engage with the distal upper end of the base 102 such that the upper end of the base 102 is overlapped by and abutted against the shouldered portion 606 of the lid 108.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A junction box mounting system, comprising:
 a junction box, including:
   a base configured to mount to a roof, the base including:
    an enclosed bottom,
    an open end opposite the enclosed bottom,
    a rear wall extending from the enclosed bottom to the open end,
    a front wall opposite the rear wall, the front wall extending from the enclosed bottom to the open end,
    a first side wall extending from the enclosed bottom to the open end, the first side wall being attached to the rear wall and the front wall,
    a second side wall opposite the first side wall extending from the enclosed bottom to the open end, the second side wall being attached to the rear wall and the front wall,
    a diverter extending from the first side wall to the second side wall in one or more directions non-parallel to the rear wall, and
    a flashing that extends:
     from a portion of the rear wall,
     from a first portion of the first side wall, and
     from a first portion of the second side wall,
     wherein the flashing is devoid from a second portion of the first side wall and a second portion of the second side wall,
  a lid sized to seal against and hingedly connect to the base; and
  a sealant positioned against an outside surface of the enclosed bottom to seal the base.

2. The junction box mounting system of claim 1, the diverter including a bottom portion and a top portion, wherein:
 the bottom portion is disposed away from the rear wall of the base at a distance, and
 the top portion is attached to the rear wall of the base.

3. The junction box mounting system of claim 1, wherein the lid includes:
 a rear side having a hinge portion configured to hingedly connect to an upper portion of the rear wall of the base, and
 a front side opposite the rear side, the front side having a lid lock portion configured to connect to an upper portion of the front wall of the base.

4. The junction box mounting system of claim 1, wherein:
 the base further includes a hinge protrusion extending from an outside surface of the rear wall of the base; and
 the lid further includes a lid hinge protrusion configured to connect to the hinge protrusion extending from the rear wall of the base.

5. The junction box mounting system of claim 4, wherein:
 the hinge protrusion is a first hinge protrusion, the lid hinge protrusion is a first lid hinge protrusion, and the junction box mounting system further including:

a second hinge protrusion adjacent to the first hinge protrusion, the second hinge protrusion extending from the rear wall of the base, and a second lid hinge protrusion adjacent to the first lid hinge protrusion, the second lid hinge protrusion extending from a rear side of the lid.

6. The junction box mounting system of claim 1, the base including a ledge extending from:

an outside edge of an upper portion of the rear wall, an outside edge of an upper portion of the first side wall, an outside edge of an upper portion of the front wall, and an outside edge of an upper portion of the second side wall.

7. The junction box mounting system of claim 1, wherein the sealant is disposed on an underside of the base to create an opening, the opening being more proximate to the front wall than the rear wall.

8. The junction box mounting system of claim 1, wherein the lid includes a captive fastener configured to attach the lid to the base.

9. A junction box comprising:

a base configured to mount to a roof, the base including:

an enclosed bottom, an open end opposite the enclosed bottom, a first side extending from the enclosed bottom to the open end, the first side having a first portion and a second portion, a second side extending from the enclosed bottom to the open end, the second side being opposite of the first side, the second side having a first portion and a second portion, a third side extending from the first side to the second side, and a fourth side extending from the first side to the second side, the fourth side being opposite the third side;

a diverter extending from the first side to the second side in one or more directions non-parallel to the third side;

a high point disposed along the diverter, the high point having an angle within a range of 90 degrees and 180 degrees;

a lid sized to seal against and hingedly connect to the base;

a continuous flashing that extends:

from the first portion of the first side of the base in a first direction away from the base, from the first portion of the second side of the base in a second direction away from the base, and from the diverter, in a third direction away from the base, wherein the continuous flashing is absent along the second portion of the first side and the second portion of the second side; and a sealant configured to anchor the base in a fixed location on the roof.

10. The junction box of claim 9, the diverter including a bottom portion and a top portion, wherein:

the bottom portion is disposed away from the third side of the base at a distance, and the top portion is attached to the third side of the base.

11. The junction box of claim 9, the lid including:

a first side having a hinge portion configured to hingedly connect to an upper portion of the third side of the base, and a second side opposite the first side, the second side having a lock portion configured to connect, via a fastener, to an upper portion of the fourth side of the base opposite the third side of the base.

12. The junction box of claim 9, wherein the diverter forms a pyramidal point against the third side of the base, the diverter being configured to direct fluid away from the base.

13. The junction box of claim 9, wherein the lid is configured to be removed from the base.

14. The junction box of claim 9, the base including a ledge extending from:

an outside edge of an upper portion of the first side of the base, an outside edge of an upper portion of the second side of the base, an outside edge of an upper portion of the third side of the base, and an outside edge of an upper portion of the fourth side of the base.

15. A junction box comprising:

a base configured to mount to a roof, the base including:

a first end, a second end opposite the first end, an enclosed bottom, an open end opposite the enclosed bottom, a first side wall extending from the enclosed bottom to the open end, the first side wall having a non-flashing portion that is devoid of flashing, a second side wall extending from the enclosed bottom to the open end, the second side wall being opposite the first side wall and having a non-flashing portion that is devoid of flashing, a third side wall extending from the first side wall to the second side wall at the first end of the base, and a fourth side wall extending from the first side wall to the second side wall at the second end of the base, the fourth side wall being opposite the third side wall;

a diverter extending from the first side wall to the second side wall in one or more directions non-parallel to the fourth side wall;

a high point disposed along the diverter, the high point having an angle within a range of 90 degrees and 180 degrees;

a lid sized to seal against and hingedly connect to the base; and a flashing that continuously extends:

from a portion of the first side wall of the base in a first direction away from the base, from a portion of the second side wall of the base in a second direction away from the base, and from the diverter, in a third direction away from the base.

16. The junction box of claim 15, the diverter including a bottom portion and a top portion, wherein:

the bottom portion is disposed away from the fourth side wall of the base at a distance, and the top portion is attached to the fourth side wall of the base.

17. The junction box of claim 15, wherein:

the base further includes one or more hinge protrusions extending from an outside surface of the fourth side wall; and the lid further includes one or more protrusions configured to connect to the one or more hinge protrusions extending from the fourth side wall of the base.

18. The junction box of claim 17, wherein the diverter includes a bottom portion and a top portion, wherein:

the bottom portion is disposed away from the fourth side wall of the base at a distance, and the top portion is attached to the fourth side wall of the base below the one or more hinge protrusions.

19. The junction box of claim 15, the base further including a ledge extending from:

an outside edge of an upper portion of the first side wall, an outside edge of an upper portion of the second side wall, an outside edge of an upper portion of the third side wall, and an outside edge of an upper portion of the fourth side wall, wherein the ledge includes a continuous surface configured to engage with the lid.

20. The junction box of claim 15, including a sealant positioned on an underside of the enclosed bottom of the base.

\* \* \* \* \*